United States Patent Office 3,529,024
Patented Sept. 15, 1970

3,529,024
METHOD OF PREPARING 3-METHYLMERCAPTO-PROPIONALDEHYDE
Takehiko Ichikawa, Kawasaki-shi, and Tetsuya Kato, Fujisawa-shi, Japan, assignors to Ajinomoto Co., Inc., Tokyo, Japan
No Drawing. Filed Feb. 23, 1968, Ser. No. 707,475
Claims priority, application Japan, Mar. 17, 1967, 42/16,691
Int. Cl. C07c 45/00
U.S. Cl. 260—601                              3 Claims

ABSTRACT OF THE DISCLOSURE 3-methylmercaptopropionaldehyde is formed in good yields by hydrolysis of the product obtained by the reaction between methylchloromethylsulfide and vinyl chloride in the presence of strong, concentrated or fuming sulfuric acid, or chlorosulfonic acid. When the reaction product is decomposed by means of an alcohol, the corresponding acetal is obtained. 3-methylmercaptopropionaldehyde and its acetals are convenient intermediates in the synthesis of methionine.

BACKGROUND OF THE INVENTION

This invention relates to the preparation of 3-methylmercaptopropionaldehyde and acetals thereof.

The aldehyde has been prepared hertofore from methylmercaptan and acrolein, but the known method requires very pure starting materials for good yields and is, therefor, subject to various restriction for use on an industrial scale.

Yet, the aldehyde and its acetals are convenient intermediates in the synthesis of methionine (Pat. No. 2,732,400), one of the amino acids essential to nutrition which is used medicinally.

SUMMARY OF THE INVENTION

It has now been found that 3-methylmercaptopropionaldehyde and its acetals can be prepared in good yields by reacting methylchloromethylsulfide with vinyl chloride in the presence of strong, concentrated or fuming sulfuric acid, or of chlorosulfonic acid, and by subjecting the reaction product to hydrolysis or decomposition by alcohols.

Methylchloromethylsulfide is readily prepared at low cost by chlorination of dimethyl sulfide, a by-product in the refining of petroleum and in the processing of waste liquor from paper mills. Vinyl chloride is an inexpensive raw material for the manufacture of synthetic resins.

The reaction mixture preferably contains at least one mole of vinyl chloride per mole of methylchloromethyl sulfide, and no beneficial results have been observed from the use of more than two moles vinyl chloride. The acid should be present in an amount of at least 0.5 mole per mole of the sulfide, but best results are usually obtained with at least one mole of acid per mole of methylchloromethyl sulfide. The sulfuric acid may contain up to 50% water, but the yield improves with decreasing water content, and a maximum is reached near 100% sulfuric acid. Fuming sulfuric acid or chlorosulfonic acid also give very good yields. The optimum ratio of sulfuric acid to sulfide is between 1:1 and 8:1 for sulfuric acid containing less than 10% water, but an even greater excess of sulfuric acid is preferred when the concentration of the acid is 90%.

The reaction must be performed in a closed vessel into which the vinyl chloride is introduced last. The evolution of heat and hydrogen chloride is recognized during the addition of sulfuric acid or chlorosulfonic acid to methylchloromethylsulfide, and therefore it is desirable to carry out the reaction at a low temperature. Useful results are obtained at reaction temperatures between about −50° C. and +50° C., and the preferred reaction temperature is between −20° C. and +10° C. Depending on specific operating conditions, the reaction is completed in 30 minutes to ten hours.

The yield is improved by acid in the reaction medium. It is, therefore, preferred not to release the hydrogen chloride formed during the reaction, and hydrogen chloride, other acids or Lewis acids may be present in the initial reaction mixture.

3-methylmercaptopropionaldehyde is obtained by diluting the reaction mixture with water. The amount of water employed is not critical, and should be selected for the convenience of further processing. It is usually convenient to pour the reaction mixture into 5 to 10 volumes of water, ice water, dilute sulfuric acid, or similar aqueous liquids.

The 3-methylmercaptopropionaldehyde thereby obtained may be separated from the solvent in a conventional manner, as by steam distillation or by chloroform extraction of the neutralized aqueous solution. The 2,4-dinitrophenylhydrazone crystallizes readily when 2,4-dinitrophenylhydrazine is added to the acid hydrolyzation mixture or is present in the aqueous liquid employed for hydrolyzation. The free aldehyde is obtained from the dinitrophenylhydrazone in a conventional manner.

The overall yield of 3-methylmercaptopropionaldehyde is usually between 50 and 80 percent, based on the methylchloromethyl sulfide initially employed.

The corresponding acetals are formed if the reaction mixture obtained from methylchloromethyl sulfide, vinyl chloride, and acid is mixed with the corresponding alcohol. The acetal forms gradually at room temperature, but more readily at higher temperature, and it is preferred to pour the reaction mixture into an excess of the alcohol and to reflux the mixture so obtained. Acetals are formed with all normally liquid alcohols, such as the monohydric lower alkanols methanol, ethanol, propanol, or butanol, and low polyhydroxy-alkanes, such as ethylene glycol or pentaerythritol. The acetal may be removed from the alcoholic medium by adding water and alkali, extracting with ether, and drying and fractionating the extract, but is not usually necessary to isolate the acetal nor the aldehyde for further conversion to methionine.

DESCRIPTION OF PREFERRED EMBODIMENTS

The following examples are further illustrative of the invention but it will be understood that the invention is not limited thereto.

Example 1

3.8 g. methylchloromethyl sulfide were added drop by drop at 0° to 2° C. to 19.6 g. 98% sulfuric acid with stirring which was continued for five minutes after the sulfide had been added. The mixture was transferred to a glass lined autoclave of 100 ml. capacity, and 3.7 g. vinyl chloride were added. The autoclave was kept at 0° C. for four hours with occasional shaking. Its contents were then poured into 800 ml. 6–N sulfuric acid containing 16 g. 2,4-dinitrophenylhydrazine, and the hydrolysis mixture was left to stand overnight.

The crystalline hydrazone of 3-methylmercapto-propionaldehyde was recovered by filtration and dried. It weighed 11.4 g., and had a purity of 69%, as calculated from its nuclear magnetic resonance spectrum measured in pyridine solution with t-butanol as an internal standard. The yield of 3-methylmercaptopropionaldehyde, therefore, was 70%, based on the methylchloromethylsulfide.

When recrystallized from methanol, the 2,4-dinitrophenylhydrazone of 3-methylmercaptopropionaldehyde had a melting point of 117–118° C. and had an infrared absorption spectrum and nuclear magnetic resonance spectrum identical with the corresponding spectra of a sample made from 2,4-dinitrophenylhydrazine and conventionally prepared 3-methylmercaptopropionaldehyde.

Example 2

Methylchloromethyl sulfide, vinyl chloride, and sulfuric acid were reacted as in Example 1, and the reaction mixture was poured into 100 ml. water. The aqueous mixture was subjected to steam distillation. The solution of 2,4-dinitrophenylhydrazine in 6-N sulfuric acid referred to in Example 1 was added to the distillate, and 3.8 g. crystalline, crude hydrazone were obtained. The yield of 3-methylmercaptopropionaldehyde, when determined as in Example 1, was 45%.

Example 3

3.8 g. methylchloromethyl sulfide were added drop by drop to 23.5 g. fuming sulfuric acid containing 8.5% free $SO_3$ at about 0° C. with stirring which was continued for 30 minutes after the sulfide had been added. The mixture was placed in the afore-described autoclave, and 3.7 ml. vinyl chloride were added with stirring. The contents of the autoclave were kept for four hours at 0° C. with stirring, and the reaction mixture was then poured into 800 ml. 6-N sulfuric acid containing 16 g. 2,4-dinitrophenylhydrazine.

Next morning, 12.1 g. crystalline hydrazone were recovered, and the yield of 3-methylmercaptopropionaldehyde was determined in the manner of Example 1 to be 72%.

Example 4

15.6 g. fuming sulfuric acid containing 8.5% free $SO_3$ were saturated with dry hydrogen chloride at 0° C., and 3.8 g. methylchloromethyl sulfide were added dropwise at 0° to 2° C. with stirring until a homogeneous solution was obtained. The solution was placed in the afore-described autoclave, and 3.7 g. vinyl chloride were added dropwise at 0° C. Dry hydrogen chloride was introduced into the autoclave until a pressure of 5 kg./cm.² was reached. The autoclave was kept at 0° C. for three hours, whereupon the reaction mixture was poured into 400 ml. 6-N sulfuric acid containing 8 g. 2,4-dinitrophenylhydrazine.

The 12.0 g. crystals of the crude hydrazone obtained thereby were found to contain 3-methylmercaptopropionaldehyde in a yield of 82%.

Example 5

3.8 g. methylchloromethyl sulfide were added drop by drop to 15.6 g. fuming sulfuric acid containing 8.5% free $SO_3$. The solution so produced was mixed with 3.7 g. vinyl chloride in an autoclave, and the reaction mixture, after standing for 4 hours at 0° C., was poured into a solution of 2,4-dinitrophenylhydrazine in dilute sulfuric acid as described in Example 1.

The 12.0 g. crystalline hydrazone recovered as described contained 3-methylmercaptopropionaldehyde corresponding to a yield of 78%.

Example 6

3.8 g. methylchloromethyl sulfide were added dropwise to 18.6 g. chlorosulfonic acid at 0°–2° C. with stirring, and 3.7 g. vinyl chloride were added to the mixture in an autoclave as described above. When the mixture, after standing 4 hours at 0° C., was poured into 800 ml. of 6-N sulfuric acid solution containing 16 g. 2,4-dinitrophenylhydrazine, a crystalline hydrazone precipitate formed overnight. The crystals weighed 12.5 g. had a purity of 36% as calculated from the nuclear magnetic resonance spectrum as described in Example 1, and represented a 40% yield of 3-methylmercaptopropionaldehyde.

Example 7

7.6 g. methylchloromethyl sulfide were dissolved in 31.2 g. fuming sulfuric acid containing 8.5% free $SO_3$, as described above, and the solution was mixed with 7.5 g. vinyl chloride in an autoclave, and left to stand 4 hours with occasional shaking. It was then poured into 200 ml. absolute methanol, and the mixture was refluxed for two hours.

It was then poured into a solution of 80.9 g. sodium bicarbonate in 800 ml. water. The resulting solution was extracted with ether, the ether layer was dried, and fractionated in a vacuum. 3.0 g. dimethyl acetal of 3-methylmercaptopropionaldehyde were obtained as a fraction boiling at 72° to 78° C. at 15 mm. Hg. The yield was 25%. The compound was identified by its infrared and nuclear magnetic resonance spectra which were identical with those of the conventionally prepared acetal.

While the invention has been described with reference to specific embodiments, it is not limited thereto, but is to be construed broadly and limited only by the spirit and scope of the appended claims.

What is claimed is:

1. A method of preparing 3-methylmercaptopropionaldehyde or an acetal thereof which comprises:
   (a) reacting methylchloromethyl sulfide with vinyl chloride in the presence of sulfuric acid or chlorosulfonic acid; and
   (b) contacting the reaction mixture with water or a liquid alkanol or polyhydroxy-alkane until said 3-methylmercaptopropionaldehyde or said acetal thereof is formed.

2. A method as set forth in claim 1, wherein said methylchloromethyl sulfide is reacted with said vinyl chloride in a liquid medium essentially consisting of said sulfuric acid and an amount of water not greater than 50% of the amount of said sulfuric acid or of said chlorosulfonic acid.

3. A method as set forth in claim 2, wherein the temperature of said medium is between —50° C. and +50° C., and the amounts of said vinyl chloride and of said acid are at least one mole per mole of said methylchloromethyl sulfide.

References Cited

UNITED STATES PATENTS 2,830,092   4/1958   Claus et al. _____ 260—615

LEON ZITVER, Primary Examiner

R. H. LILES, Assistant Examiner

U.S. Cl. X.R.

260—615, 458, 609, 569, 340.9, 340.7